(12) United States Patent
Kato

(10) Patent No.: US 10,281,993 B2
(45) Date of Patent: May 7, 2019

(54) FOOT-OPERATED POINTING DEVICE

(71) Applicant: EDIKUN Technology Inc., Saitama (JP)

(72) Inventor: Isamu Kato, Saitama (JP)

(73) Assignee: EDIKUN Technology Inc., Saitama (JP)

(*) Notice: Subject to any disclaimer, the term of this patent is extended or adjusted under 35 U.S.C. 154(b) by 349 days.

(21) Appl. No.: 14/857,354

(22) Filed: Sep. 17, 2015

(65) Prior Publication Data
US 2017/0083112 A1 Mar. 23, 2017

(51) Int. Cl.
*G06F 3/033* (2013.01)

(52) U.S. Cl.
CPC .................. *G06F 3/0334* (2013.01)

(58) Field of Classification Search
CPC ...... G06F 3/0334; G06F 3/0414; G06F 3/033; G06F 3/0338; G06F 3/0346; G06F 3/0354; G06F 3/03541
See application file for complete search history.

(56) References Cited

U.S. PATENT DOCUMENTS

| | | | | |
|---|---|---|---|---|
| 5,841,426 A * | 11/1998 | Dodson | ............ | G06F 3/0334 |
| | | | | 273/148 B |
| 6,008,797 A * | 12/1999 | Sanderson | ............ | G05G 1/30 |
| | | | | 345/156 |
| 2002/0180695 A1 * | 12/2002 | Lawrence | ............ | G06F 1/163 |
| | | | | 345/156 |
| 2008/0129683 A1 * | 6/2008 | Li | ............ | G06F 3/0334 |
| | | | | 345/156 |
| 2012/0206356 A1 * | 8/2012 | Campbell | ............ | G06F 3/0334 |
| | | | | 345/163 |
| 2014/0267195 A1 * | 9/2014 | Enns | ............ | G06F 3/0334 |
| | | | | 345/184 |
| 2016/0034089 A1 * | 2/2016 | Kano | ............ | G06F 3/044 |
| | | | | 345/173 |

FOREIGN PATENT DOCUMENTS

| | | | | |
|---|---|---|---|---|
| JP | H10-097374 A | * | 4/1998 | ............ G06F 3/033 |
| JP | 2001-022512 A | | 1/2001 | |
| JP | 2017-033489 A | * | 2/2017 | ............ G06F 3/0354 |

* cited by examiner

*Primary Examiner* — Nicholas J Lee
*Assistant Examiner* — Gerald L Oliver
(74) *Attorney, Agent, or Firm* — Studebaker & Brackett PC

(57) ABSTRACT

A reaction force applying part 5 includes an abutting part (20) provided in one of a moving part (3) and a footrest part (4) and having a first abutting surface (21) and a second abutting surface (22) arranged in a Y direction, a following part (30) provided in the other of the moving part (3) and the footrest part (4) and configured to follow a first rotation operation A of the footrest member (12) and relatively move along the first abutting surface (21) and the second abutting surface (22) while abutting on the first abutting surface (21) and the second abutting surface (22), and a biasing member (40) configured to cause a biasing force to act between the following part (30) and the first abutting surface (21), and between the following part 30 and the second abutting surface (22).

6 Claims, 12 Drawing Sheets

FOOT-OPERATED POINTING DEVICE

TECHNICAL FIELD

The present invention relates to a foot-operated pointing device.

BACKGROUND

A foot-operated pointing device has been known which operates a pointer or the like displayed on an operation screen of a computer or the like by a foot. As a conventional foot-operated pointing device, there is a foot-operated pointing device which includes a base, a moving part oppositely disposed on the base and moveable along a top surface of the base, a footrest part oppositely disposed on the moving part and rotatable with respect to the moving part (for example, see JP 2001-22512A).

In such a foot-operated pointing device, a spring and a switch which outputs a signal for a click are provided between the moving part and the footrest part. A user can feel a click feeling at a moment when contacts of the switch are switched by pressing the footrest part against a biasing force of the spring and the switch.

SUMMARY

In the aforementioned foot-operated pointing device, a built-in type general-purpose switch is used. In the case of using such a switch, the biasing force against the footrest part, and a distance from a position where the switch starts to be pressed to a position where the contacts are switched are both not sufficient. That is, the foot-operated pointing device is operated by a foot which is insensitive compared to a hand, thereby hardly providing a sufficient click feeling. Accordingly, improvement of the click feeling is required.

An object of the present invention is to provide a foot-operated pointing device capable of improving a click feeling.

A foot-operated pointing device according to an embodiment of the present invention includes: a base; a moving part oppositely disposed on the base and moveable along a top surface of the base; a footrest part oppositely disposed on the moving part; and a reaction force applying part configured to apply a reaction force to the rotating footrest part, wherein the footrest part includes: a footrest member rotating with respect to the moving part around a first direction intersecting with an opposite direction between the moving part and the footrest part, and having one end and the other end in a second direction intersecting with the opposite direction and the first direction, the reaction force applying part applies a reaction force to the footrest member in a case of a first rotation operation in which the one end of the footrest member is close to the moving part, the reaction force applying part includes: an abutting part provided in one of the moving part and the footrest part and having a first abutting surface and a second abutting surface arranged in the second direction; a following part provided in the other of the moving part and the footrest part and configured to follow the first rotation operation of the footrest member to relatively move along the first abutting surface and the second abutting surface while abutting on the first abutting surface or the second abutting surface; and a biasing member configured to cause a biasing force to act between the following part and the first abutting surface, and between the following part and the second abutting surface, the following part abuts on the first abutting surface and the second abutting surface in an order thereof in the first rotation operation, and the second abutting surface is inclined with respect to the first abutting surface.

In the foot-operated pointing device, the second abutting surface is inclined with respect to the first abutting surface. Therefore, a reaction force applied to the abutting part by the following part is changed instantaneously and largely at a time when the following part is transferred from the first abutting surface to the second abutting surface. As a result, a click feeling is provided to the user through the footrest part. Therefore, according to the foot-operated pointing device, it is possible to improve the click feeling by using a slope of the second abutting surface with respect to the first abutting surface.

A foot-operated pointing device according to another aspect of the present invention may further include a support part provided in the moving part to support one of the abutting part and the following part, wherein the support part is slidable with respect to the moving part. In this case, the following part stably and relatively moves along the first abutting surface and the second abutting surface. Accordingly, the abutting state of the following part with respect to the first abutting surface and the second abutting surface can be stabilized and the click feeling can be improved.

A foot-operated pointing device according to another aspect of the present invention may further include a support part provided in the moving part to support one of the abutting part and the following part, wherein the support part is rotatable with respect to the moving part. Therefore, it is possible to stabilize an abutting state of the following part with respect to the first abutting surface and the second abutting surface even in a case in which a rotation mechanism is applied to the support part.

A foot-operated pointing device according to another aspect of the present invention may further include an adjusting part configured to adjust an abutting state of the following part with respect to the abutting part. In this case, it is possible to realize a neutral state in which the abutting part does not receive a force from a biasing member and the abutting part comes into contact with the following part. Therefore, it is possible to more improve a click feeling.

A foot-operated pointing device according to another aspect of the present invention may further include a first detection part configured to detect a movement of the moving part; a second detection part configured to detect a rotation of the footrest member with respect to the moving part; and a controller configured to instruct movement of a pointer based on a detection value from the first detection part and instruct a click when a detection value from the second detection part becomes equal to or greater than a first threshold value and thereafter, becomes equal to or less than a second threshold value, wherein the controller may stop instruction of the movement of the pointer when the detection value from the second detection part becomes equal to or greater than a third threshold value indicating that the detection value approaches the first threshold value in a state in which the movement of the pointer is being instructed and the detection value from the second detection part is below the first threshold value. In this case, the movement of a pointer on an operation screen of a computer or the like is stopped. The user who has seen that the pointer no longer moves finds out that the rotation of the footrest member is too large, and loosens the force of the user's foot. In this way, it is possible to prevent the detection value from the second detection part from becoming equal to or greater than the first threshold value, and prevent a case in which the movement of the pointer is dragged.

A foot-operated pointing device according to another aspect of the present invention may further include a first detection part configured to detect a movement of the moving part; a second detection part configured to detect a rotation of the footrest member with respect to the moving part; and a controller configured to instruct movement of a pointer based on a detection value from the first detection part and instruct a click when a detection value from the second detection part becomes equal to or greater than a first threshold value and thereafter, becomes equal to or less than a second threshold value, wherein the controller may instruct a drag when the detection value from the second detection part is maintained equal to or greater than the first threshold value and instruction of the movement of the pointer is being performed, and may stop instruction of the movement of the pointer when the detection value from the second detection part becomes equal to or less than a fourth threshold value indicating that the detection value approaches the second threshold value in a state in which the drag is being instructed. In this case, the movement of an icon or the like which is dragged on the operation screen of the computer or the like is stopped. The user who has seen that the icon or the like no longer moves, finds out that the rotation of the footrest member is too small, and rotates the footrest member sufficiently by strengthening a force of the user's foot. In this way, it is possible to prevent the detection value from the second detection part from becoming equal to or less than the second threshold value, and prevent a case in which the drag is unintentionally terminated.

A foot-operated pointing device according to another aspect of the present invention may further include a first detection part configured to detect a movement of the moving part; a second detection part configured to detect a rotation of the footrest member with respect to the moving part; a controller configured to instruct movement of a pointer based on a detection value from the first detection part, and instruct a click when a detection value from the second detection part becomes equal to or greater than the first threshold value and thereafter, becomes equal to or less than a second threshold value; and a storage part configured to store at least one of the first threshold value and the second threshold value, wherein the controller may change at least one of the first threshold value and the second threshold value stored in the storage part based on an output from the outside. In this case, it is possible to change a force necessary for a click and a drag according to the strength of a force from a foot of the user. As a result, it is possible to realize an operation environment suitable for each of users.

According to the present invention, it is possible to improve a click feeling.

DETAILED DESCRIPTION

Figure 1:
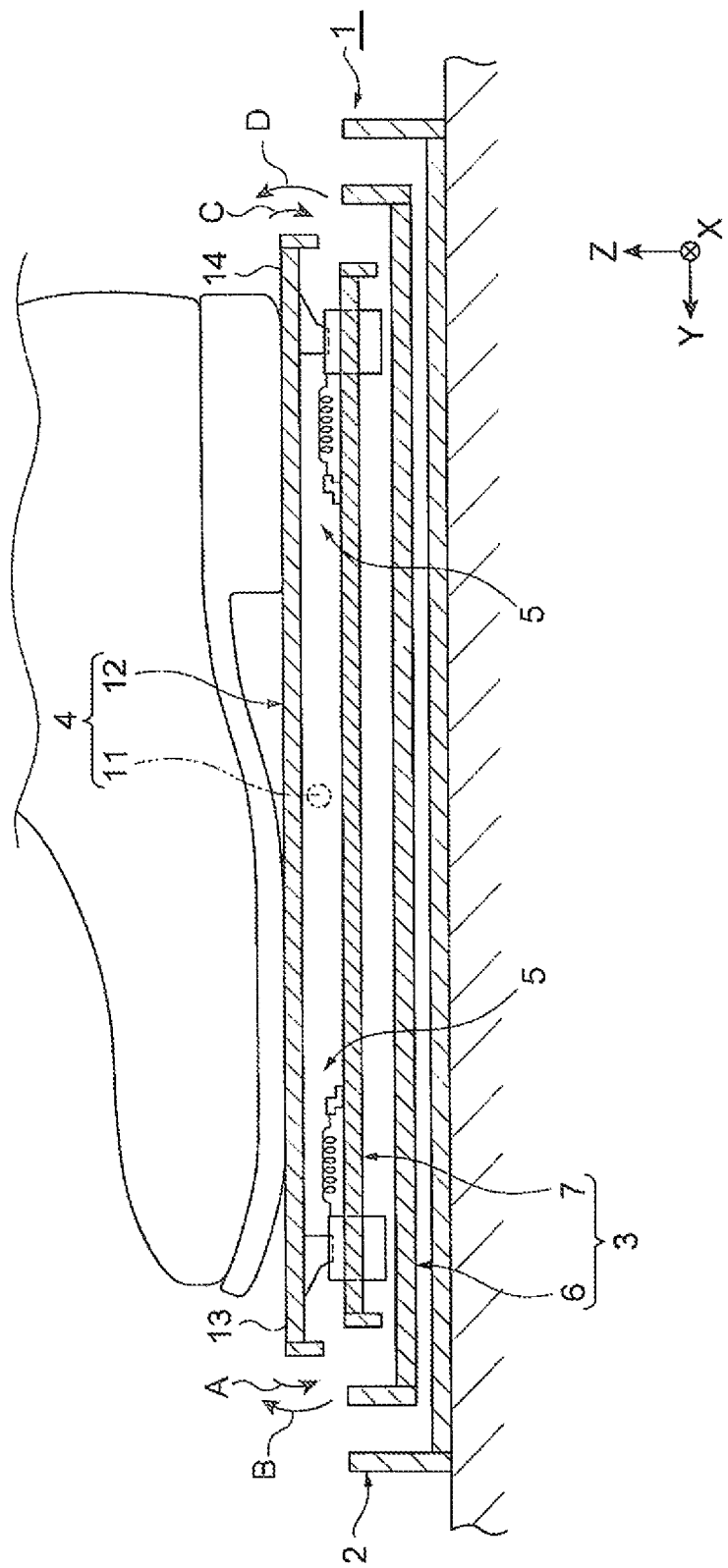
FIG. 1 is a schematic diagram illustrating a side cross section of a foot-operated pointing device according to a first embodiment.

Hereinafter, embodiments of the invention will be described with reference to the drawings. In the description of the drawings, the same parts are represented by the same reference numerals, and overlapping description will be omitted.

First Embodiment

Figure 2:
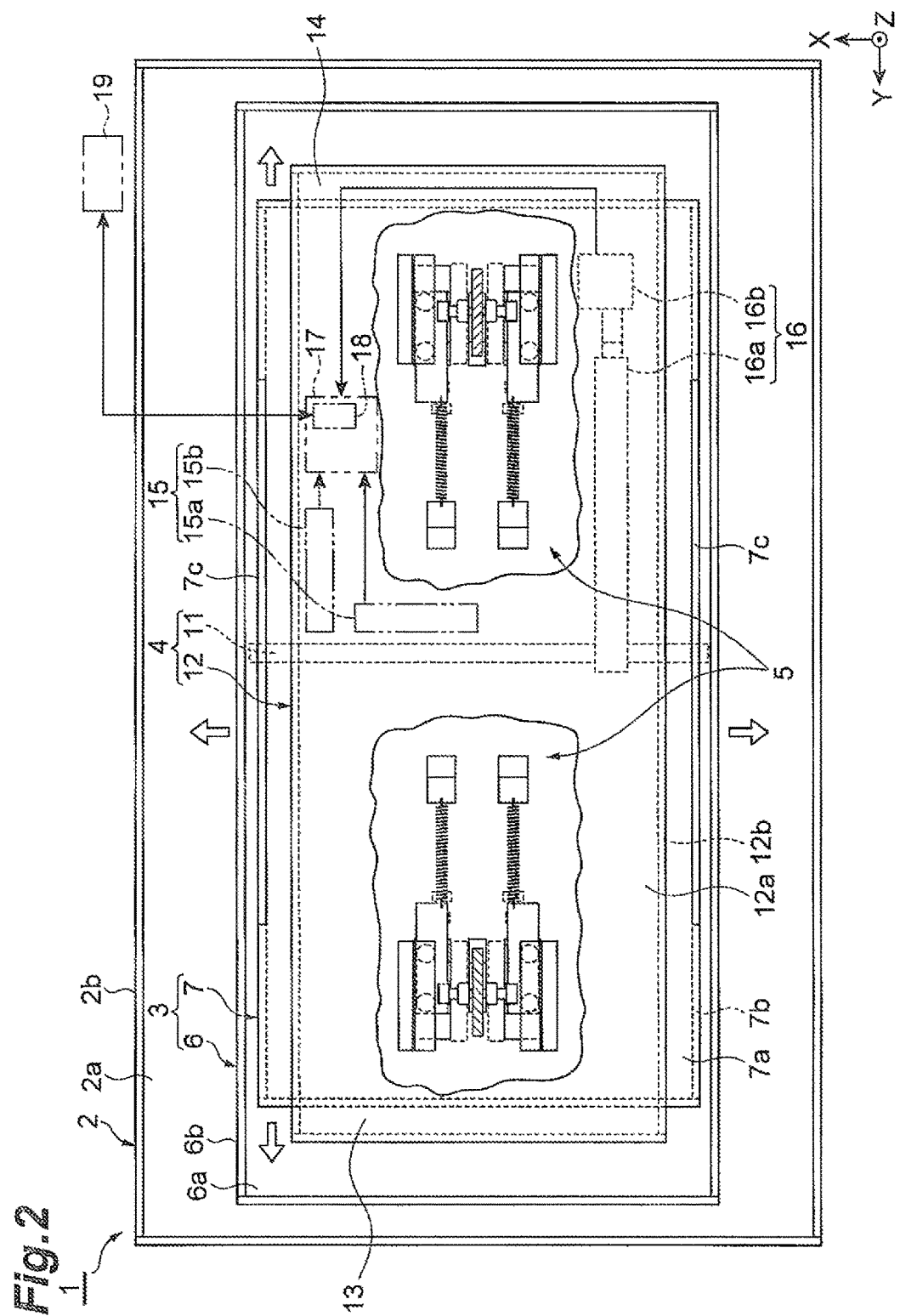
FIG. 2 is a plan view of the foot-operated pointing device of FIG. 1.

Referring to FIGS. 1 and 2, a foot-operated pointing device 1 according to a first embodiment will be described. The foot-operated pointing device 1 is a device for operating a pointer or the like displayed on an operation screen of a computer or the like by a foot.

As illustrated in FIG. 1, the foot-operated pointing device 1 includes a base 2 placed on a floor or the like, a moving part 3 oppositely disposed on the base 2 and moveable along a top surface of the base 2, a footrest part 4 oppositely disposed on the moving part 3 and rotatable with respect to the moving part 3, and two reaction force applying parts 5 each configured to apply a reaction force to the rotating footrest part 4. As illustrated in FIG. 2, the base 2 includes a bottom plate 2a having an approximate rectangular shape in plane view and four side plates 2b protruding upwardly from four sides of the bottom plate 2a.

The moving part 3 is moveable along a top surface of the bottom plate 2a of the base 2. The moving part 3 is surrounded by the four side plates 2b of the base 2 and is accommodated within the base 2. The moving part 3 includes a first moving part 6 disposed on the bottom plate 2a, and a second moving part 7 disposed on the first moving part 6. The first moving part 6 is moveable in a first direction (hereinafter, referred to as an "X direction") which is perpendicular to an opposite direction (hereinafter, referred to as a "Z direction") between the moving part 3 and the footrest part 4. The second moving part 7 is moveable along a second direction (hereinafter, referred to as a "Y direction") which is perpendicular to the Z direction and the X direction.

The first moving part 6 includes a bottom plate 6a having an approximate rectangular shape in plane view, and four side plates 6b protruding upwardly from four sides of the bottom plate 6a. The first moving part 6 is supported on the base 2 by a plurality of wheels (not illustrated). The first moving part 6 relatively moves in the X direction with respect to the base 2 in such a way that the wheels turn. Also, when the first moving part 6 arrives at near a stroke end of a movement range, the first moving part 6 receives a larger force by an elastic body (not illustrated) enough to be close to the stroke end.

The second moving part 7 includes a top plate 7a having an approximate rectangular shape in plane view, four side plates 7b protruding downwardly from four sides of the top plate 7a, and two support plates 7c protruding upwardly from two sides opposite to each other in the X direction among the four sides of the top plate 7a. The two support plates 7c rotatably support both ends of a shaft 11 which is described below. The second moving part 7 is surrounded by the four side plates 6b of the first moving part 6 and is accommodated within the first moving part 6. The second moving part 7 is supported on the first moving part 6 by a plurality of wheels (not illustrated). The second moving part 7 relatively moves in the Y direction with respect to the first moving part 6 in such a way that the wheels turn. Also, when the second moving part 7 arrives at near a stroke end of a movement range, the second moving part 7 receives a larger force by an elastic body (not illustrated) enough to be close to the stroke end.

The footrest part 4 includes the shaft 11 extending in the X direction and a footrest member 12 which rotates around the shaft 11. As described above, the both ends of the shaft 11 are rotatably supported by the two support plates 7c. The footrest member 12 includes a top plate 12a having an approximate rectangular shape in plane view, and four side plates 12b protruding downwardly from four sides of the top plate 12a. A foot of a user is placed on a top surface of the top plate 12a. The two side plates 12b which face each other in the X direction are rotatably supported by the shaft 11. This enables the footrest member 12 to rotate with respect to the moving part 3 around the X direction.

When a state in which the top plate 12a is kept horizontal is given as a neutral state, the footrest member 12 enables the following rotation operation. That is, the footrest member 12 executes a first rotation operation A in which one end 13 comes close to the moving part 3 from the neutral state in the Y direction of the footrest member 12, and a second rotation operation B in which the one end 13 returns to the neutral state from the first rotation operation A. Also, the footrest member 12 executes a third rotation operation C in which the other end 14 comes close to the moving part 3 from the neutral state in the Y direction of the footrest member 12, and a fourth rotation operation D in which the other end 14 returns to the neutral state from the third rotation operation C. Although an end of the footrest member 12 placed on the left side of the sheet of FIG. 2 with respect to the shaft 11 is referred to as "one end 13", and an end of the footrest member 12 placed on the right side of the sheet of FIG. 2 with respect to the shaft 11 is referred to as "the other end 14" in the present embodiment, the one end 13 and the other end 14 may be interchangeably referred to as each other's names. In this case, the operation in which the other end 14 comes close to the moving part 3 from the neutral state is the first rotation operation A, and the operation in which the other end 14 returns to the neutral state is the second rotation operation B. Also, the operation in which the one end 13 comes close to the moving part 3 from the neutral state is the third rotation operation C, and the operation in which the one end 13 returns to the neutral state is the fourth rotation operation D.

Among the two reaction force applying parts 5, one reaction force applying part 5 is disposed closer to the one end 13 than the shaft 11, between the second moving part 7 and the footrest member 12. The one reaction force applying part 5 applies a reaction force to the footrest member 12 in the cases of the first rotation operation A and the second rotation operation B. The other reaction force applying part 5 is disposed closer to the other end 14 than the shaft 11, between the second moving part 7 and the footrest member 12. The other reaction force applying part 5 applies a reaction force to the footrest member 12 in the cases of the third rotation operation C and the fourth rotation operation D. A detailed configuration of the reaction force applying part 5 will be described below.

As illustrated in FIG. 2, the foot-operated pointing device 1 further includes a first detection part 15 which detects a movement of the moving part 3, a second detection part 16 which detects a rotation of the footrest member 12 with respect to the moving part 3, and a controller 17 which receives detection values output by the first detection part 15 and the second detection part 16.

The first detection part 15 includes an X-direction detection part 15a which detects an X-direction movement with respect to the base 2 of the first moving part 6 and a Y-direction detection part 15b which detects a Y-direction movement with respect to the first moving part 6 of the second moving part 7. The X-direction detection part 15a is, for example, a linear-type variable resistor. The X-direction detection part 15a is disposed between the base 2 and the first moving part 6. When the first moving part 6 moves in the X direction with respect to the base 2, a resistance value of the X-direction detection part 15a is changed. Based on a change in the resistance value, an X-direction movement with respect to the base 2 of the first moving part 6 is detected.

The Y-direction detection part 15b is, for example, a linear-type variable resistor. The Y-direction detection part 15b is disposed between the first moving part 6 and the second moving part 7. When the second moving part 7 moves in the Y direction with respect to the first moving part 6, a resistance value of the Y-direction detection part 15b is changed. Based on a change in the resistance value, a Y-direction movement with respect to the first moving part 6 of the second moving part 7 is detected. Also, the X-direction detection part 15a and the Y-direction detection part 15b may not be a linear-type variable resistor, for example, may be a linear-type encoder, or the like.

Figure 3:
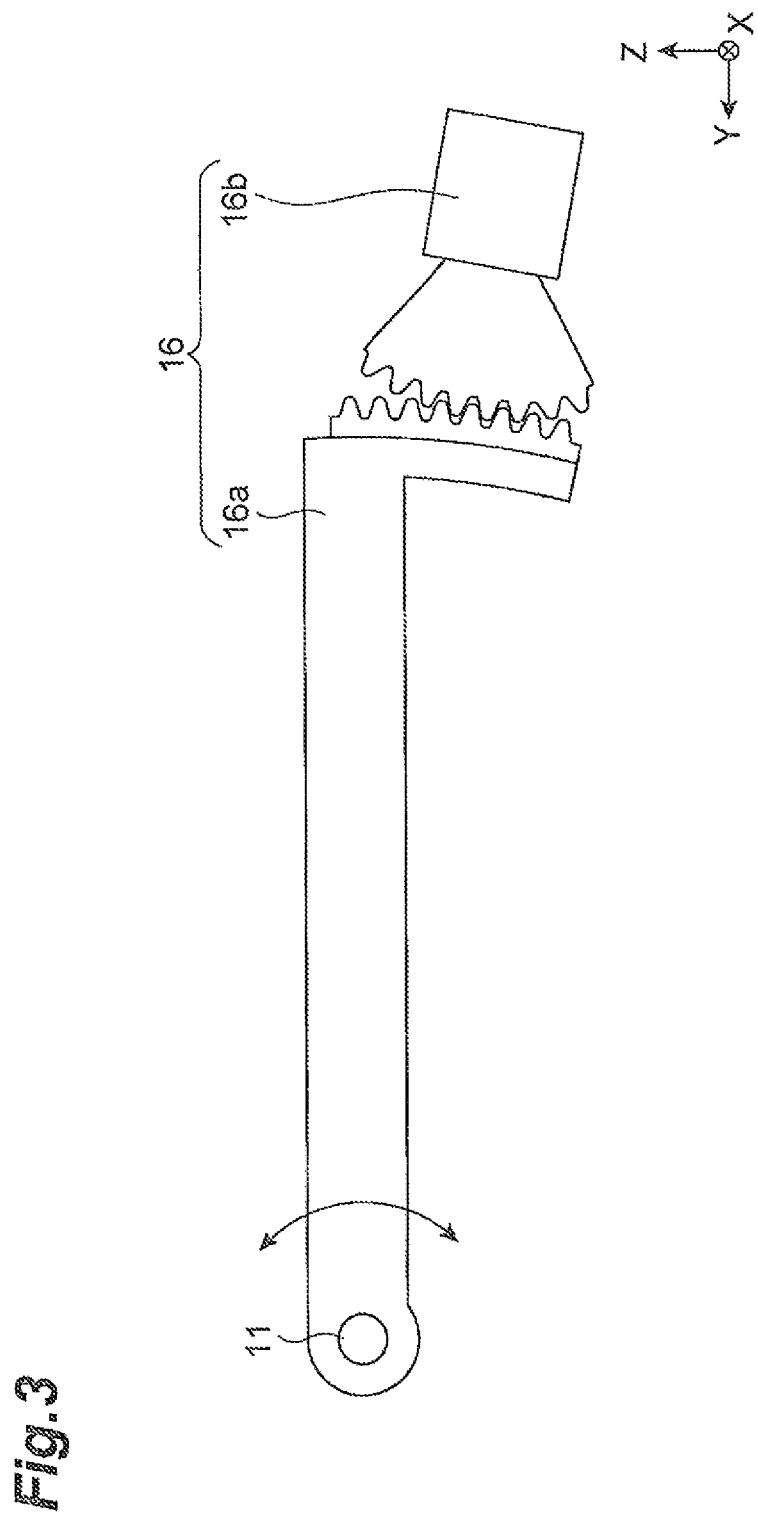
FIG. 3 is a diagram illustrating a second detection part included in the foot-operated pointing device of FIG. 1.

As illustrated in FIG. 3, the second detection part 16 includes a lever part 16a having a base end attached to the shaft 11 and an angle detection part 16b connected to a front end of the lever part 16a to detect a rotation amount of the lever part 16a. The angle detection part 16b is, for example, a rotary-type variable resistor. When the footrest member 12 rotates, the lever part 16a fixed to the top plate 12a by a member (not illustrated) rotates, and a resistance value of the angle detection part 16b is changed. Based on a change in the resistance value, a rotation of the footrest member 12 with respect to the moving part 3 is detected. Also, the angle detection part 16b may not be a rotary type variable resistor, for example, may be a rotary type encoder or the like.

In this case, the second detection part 16 makes a rotation angle input to the angle detection part 16b larger than a rotation angle of the footrest member 12 by using the lever part 16a. For example, the footrest member 12 rotates 6 degrees at most by the first rotation operation A, and rotates 6 degrees at most by the third rotation operation C. That is, the footrest member 12 rotates only within a range of 12 degrees. Even in this case, the rotation angle input to the angle detection part 16b can be, for example, about four to five times (48 to 60 degrees) by the lever part 16a. Also, a connection portion between the lever part 16a and the angle detection part 16b has a gear shape to be engaged with each other.

The controller 17 is an electronic control unit, such as a microcomputer including a central processing unit (CPU), a read only memory (ROM), a random access memory (RAM) and the like. The controller 17 instructs movement of a pointer with respect to a computer 19 provided at the outside, based on a detection value from the first detection part 15. Therefore, when a user moves the footrest member 12 in the X direction and the Y direction, a movement of a pointer displayed on an operation screen of the computer 19 is executed.

When a detection value from the second detection part 16 becomes equal to or greater than a first threshold value and thereafter, becomes equal to or less than a second threshold value, the controller 17 instructs a click with respect to the computer 19. More specifically, when the first rotation operation A is executed, and therefore, the footrest member 12 is pressed from the neutral state to a predetermined position, a detection value from the footrest member 12 becomes equal to or greater than the first threshold value. Thereafter, when the second rotation operation B is executed, and therefore, the footrest member 12 is returned (released) to a predetermined position toward the neutral state, the detection value from the footrest member 12 becomes equal to or greater than the second threshold value. Therefore, for example, a left click is executed on the operation screen of the computer 19. Similarly, when the third rotation operation C is executed and therefore, the footrest member 12 is pressed from the neutral state to a predetermined position, the detection value from the footrest member 12 becomes equal to or greater than the first threshold value. Thereafter, when the fourth rotation operation D is executed and therefore, the footrest member 12 is returned (released) to a predetermined position toward the neutral state, the detection value from the footrest member 12 becomes equal to or less than the second threshold value. Therefore, for example, a right click is executed on the operation screen of the computer 19. Also, the second threshold value may be less than the first threshold value or may be equal to the first threshold value.

When the detection value from the second detection part 16 is maintained equal to or greater than the first threshold vale and movement of the pointer is instructed, the controller 17 instructs a drag with respect to the computer 19. More specifically, the first rotation operation A and the third rotation operation C is executed and therefore, the footrest member 12 is pressed from the neutral state to a predetermined position, the detection value from the footrest member 12 becomes equal to or greater than the first threshold value. When the movement of the pointer is instructed before and after the above state, the drag is executed on the operation screen of the computer 19.

When the detection value from the second detection part 16 is equal to or greater than a third threshold value indicating that the detection value approaches the first threshold value in a state in which the movement of the pointer is being instructed and the detection value from the second detection part 16 is below the first threshold value, the controller 17 stops instruction of the movement of the pointer. Therefore, the movement of the pointer on the operation screen of the computer 19 is stopped. The user who has seen that the pointer no longer moves finds out that the rotation of the footrest member 12 is too large, and loosens the force of the user's foot. In this way, it is possible to prevent the detection value from the second detection part 16 from becoming equal to or greater than the first threshold value, and prevent a case in which the movement of the pointer is dragged. Also, a rotation angle from a neutral state corresponding to the third threshold value is smaller than a rotation angle from a neutral state corresponding to the first threshold value.

When the detection value from the second detection part 16 becomes equal to or less than the fourth threshold value indicating that the detection value approaches the second threshold value in the state in which the drag is being instructed, the controller 17 stops instruction of the movement of the pointer. Therefore, the movement of an icon or the like which is dragged on the operation screen of the computer 19 is stopped. The user who has seen that the icon or the like no longer moves finds out that the rotation of the footrest member 12 is too small, and rotates the footrest member 12 sufficiently by strengthening a force of the user's foot. In this way, it is possible to prevent the detection value from the second detection part 16 from becoming equal to or less than the second threshold value, and prevent a case in which the drag is unintentionally terminated. Also, a rotation angle corresponding to the fourth threshold value is greater than a rotation angle corresponding to the second threshold value.

The foot-operated pointing device 1 further include a storage part 18 which stores the first threshold value, the second threshold value, the third threshold value, and the fourth threshold value. The storage part 18 is, for example, a part of the controller 17. The controller 17 changes the first threshold value and the second threshold value stored in the storage part 18 based on the output from the computer 19. Therefore, it is possible to change a force necessary for a click and a drag according to a force from a foot of the user. As a result, it is possible to realize an operation environment suitable for each of users. The storage part 18 may store at least one of the first threshold value and the second threshold value without storing all of the first threshold value to the fourth threshold value. In this case, the controller 17 changes at least one of the first threshold value and the second threshold value stored in the storage part 18 based on the output from the computer 19. Also, the storage part 18 may be provided as a separate component from the controller 17.

Subsequently, a detailed configuration of the reaction force applying part 5 will be described with reference to FIGS. 4 to 8. Hereinafter, the description is given under the assumption that the footrest member 12 is in the neutral state.

Figure 4:
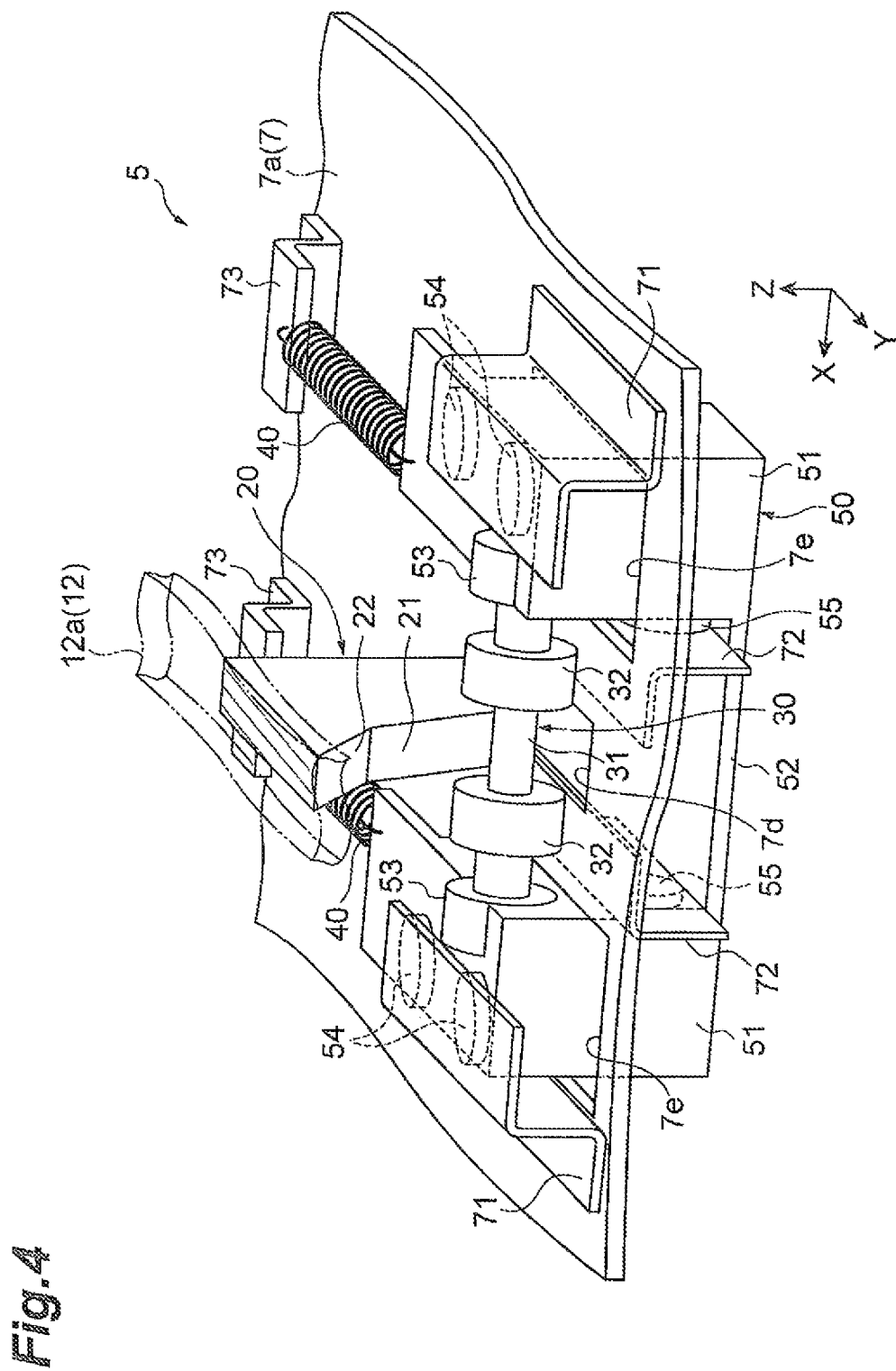
FIG. 4 is a perspective view illustrating a reaction force applying part of FIG. 1.
Figure 5:
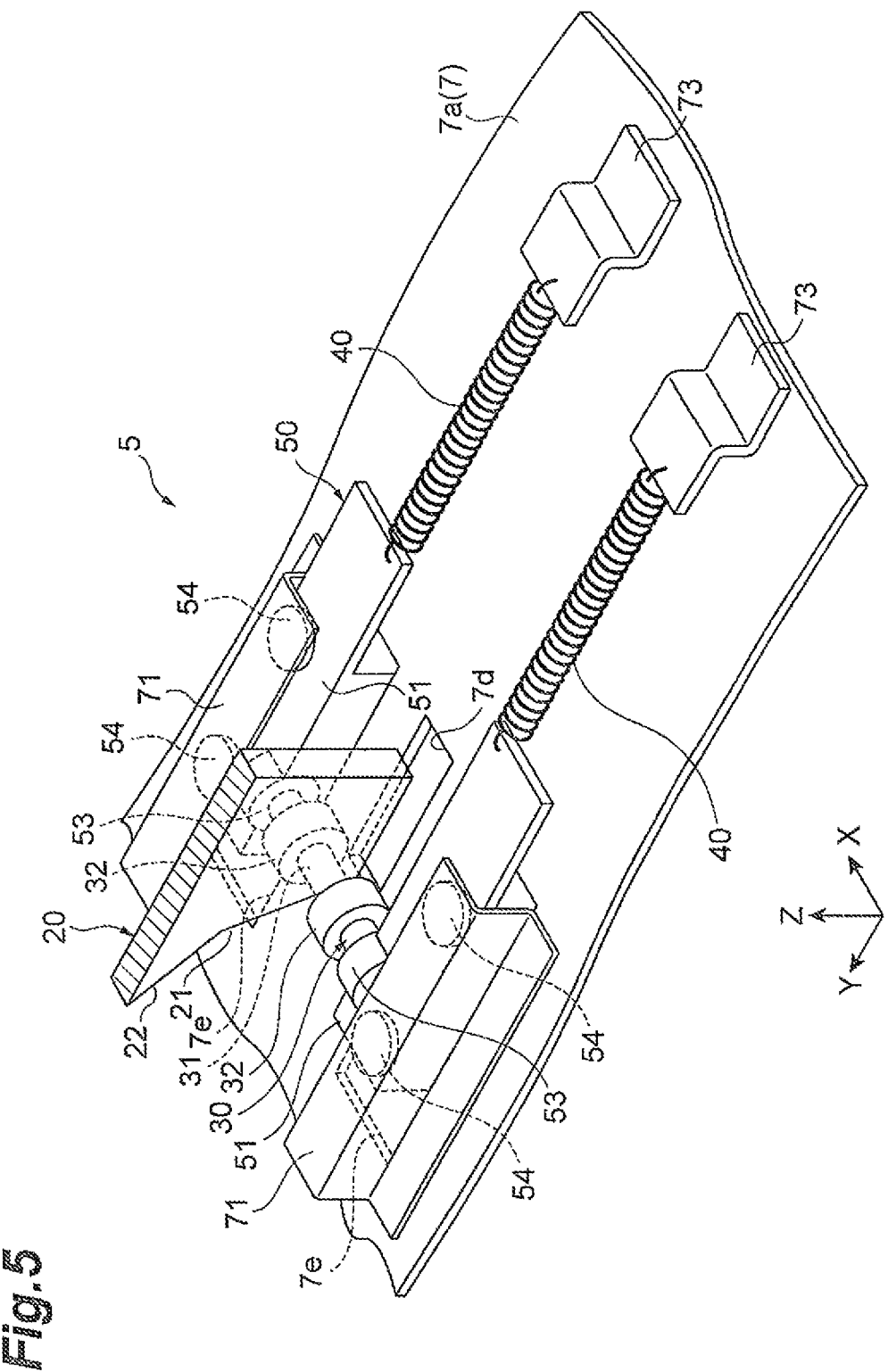
FIG. 5 is a perspective view illustrating the reaction force applying part of FIG. 1, viewed from a different direction from FIG. 4.
Figure 6:
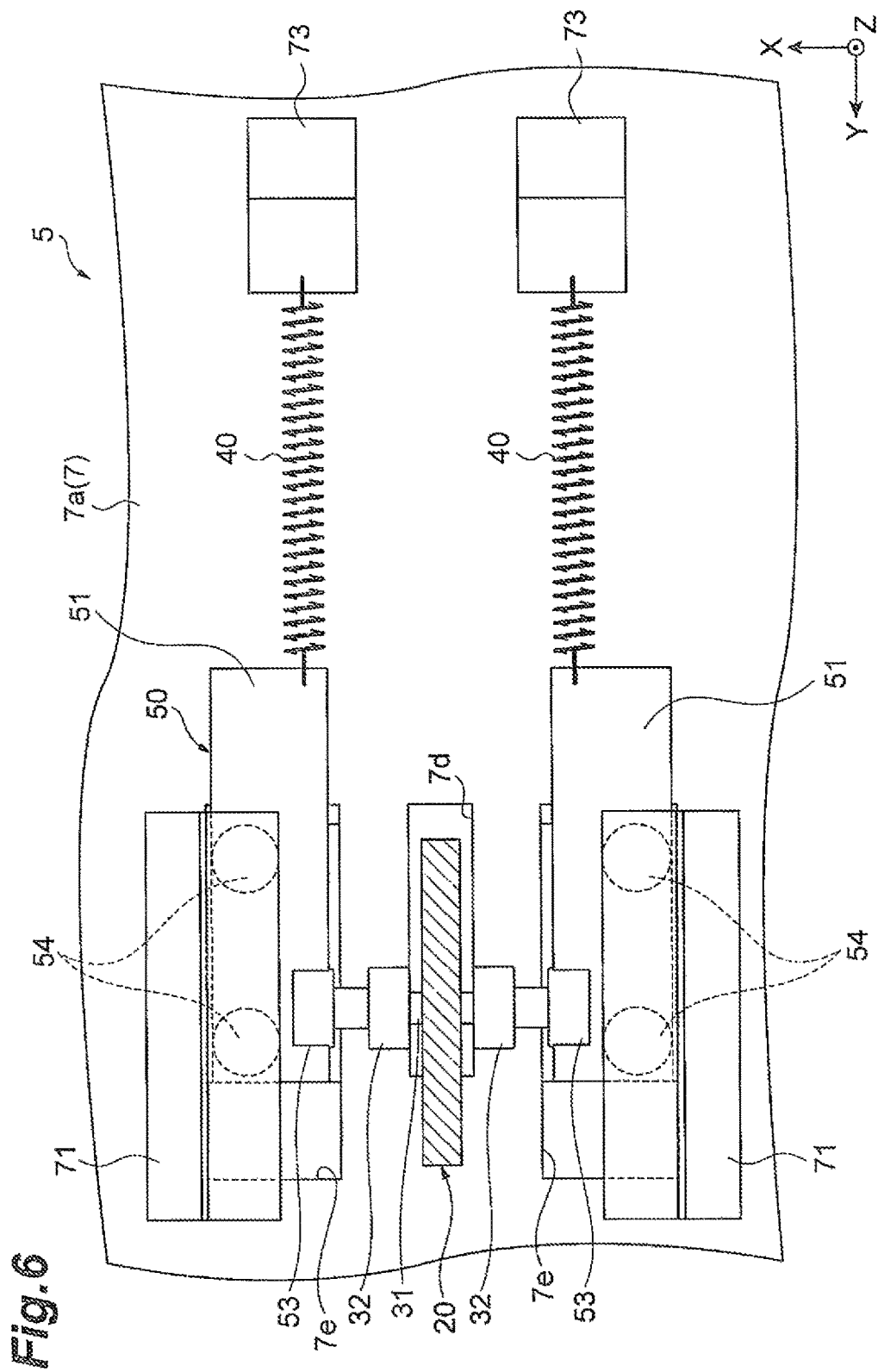
FIG. 6 is a plan view illustrating the reaction force applying part of FIG. 1.
Figure 8:
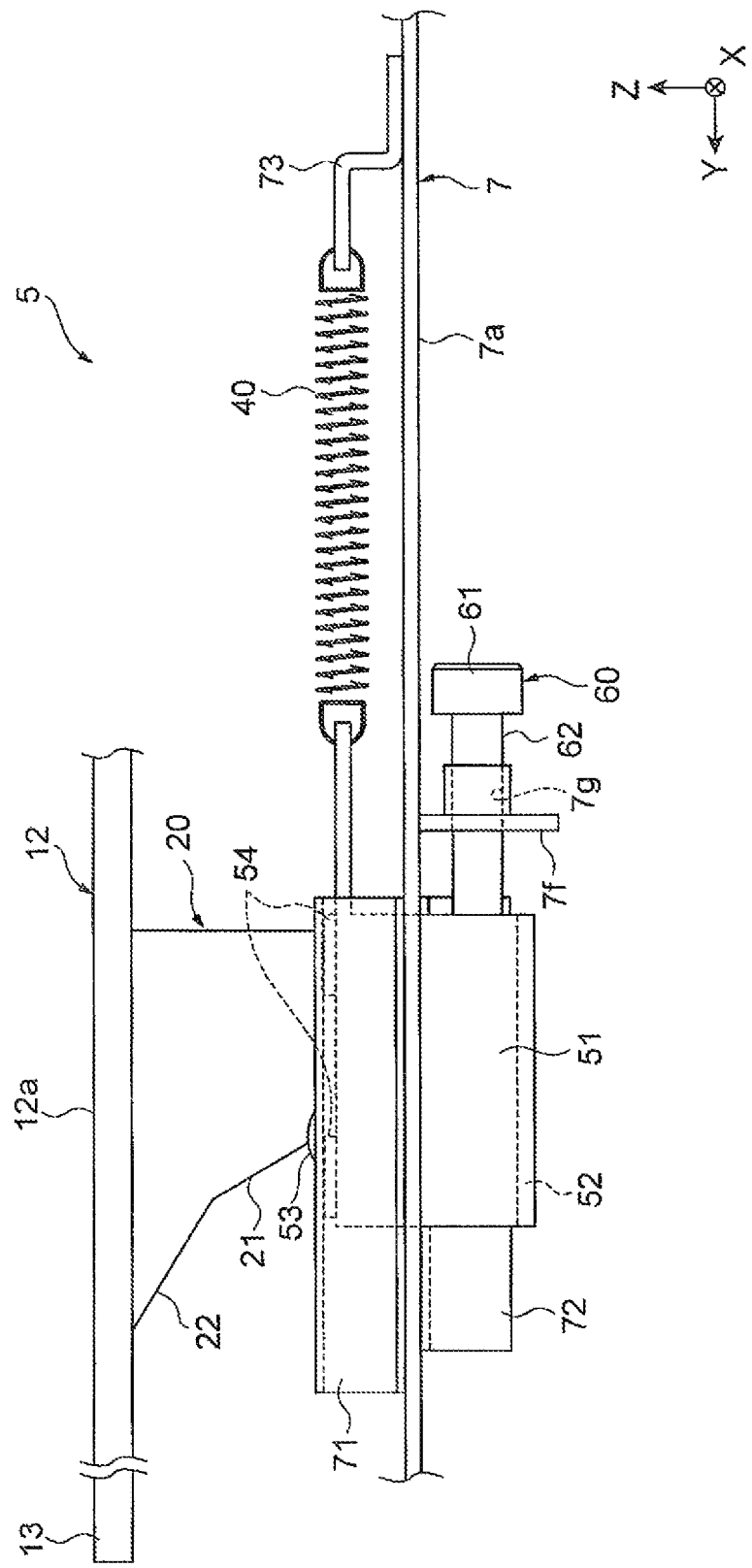
FIG. 8 is a side view illustrating the reaction force applying part of FIG. 1.

As illustrated in FIG. 4, the reaction force applying part 5 includes an abutting part 20 provided in the footrest member 12, a following part 30 abutting on the abutting part 20, a support part 50 provided in the moving part 3 (second moving part 7) to support the following part 30, a pair of biasing members 40 and 40 configured to bias the following part 30 with respect to the abutting part 20, and a pair of adjusting parts 60 and 60 configured to adjust an abutting state of the following part 30 with respect to the abutting part 20 (see FIG. 8). Also, the two reaction force applying parts 5 have the same configuration. Therefore, the reaction force applying part 5 on the one end 13 will be described below, and a description for the reaction force applying part 5 on the other end 14 will be omitted. As illustrated in FIG. 2, the two reaction force applying parts 5 are arranged in linear symmetry with respect to the shaft 11 when viewed in plan view from the Z direction.

The abutting part 20 is disposed between the one end 13 of the footrest member 12 and the shaft 11 in the Y direction. As illustrated in FIG. 4, the abutting part 20 is provided in the top surface of the top plate 12a of the footrest member 12. The abutting part 20 protrudes downwardly from the bottom surface of the top plate 12a. The abutting part 20 rotates around the shaft 11 by the first rotation operation A and the second rotation operation B of the footrest member 12. In the case of the first rotation operation A, a first opening 7d into which the abutting part 20 is inserted is provided in the top plate 7a of the second moving part 7.

The abutting part 20 is a plate-like member whose thickness direction is the X direction. The abutting part 20 includes a first abutting surface 21 and a second abutting surface 22 as end surfaces directed to the one end 13 of the footrest member 12. More specifically, the abutting part 20 includes a base end provided on the side of the top plate 12a and a front end downwardly protruding from the base end and having a tapered shape. The first abutting surface 21 is an end surface on the side of the one end 13 at the front end, and the second abutting surface 22 is an end surface on the side of the one end 13 at the base end.

As illustrated in FIG. 8, the first abutting surface 21 and the second abutting surface 22 are arranged in the Y direction. The first abutting surface 21 and the second abutting surface 22 are arranged from the shaft 11 toward the one end 13 in the order of the first abutting surface 21 and the second abutting surface 22. The first abutting surface 21 and the second abutting surface 22 are connected adjacent to each other in the Y direction.

Also, the first abutting surface 21 and the second abutting surface 22 are arranged in the Z direction. The first abutting surface 21 and the second abutting surface 22 are arranged from the second moving part 7 toward the footrest member 12 in the order of the first abutting surface 21 and the second abutting surface 22. The first abutting surface 21 and the second abutting surface 22 are connected adjacent to each other in the Z direction.

The first abutting surface 21 and the second abutting surface 22 are inclined with respect to a line parallel to the Z direction when the footrest member 12 is in the neutral state. The first abutting surface 21 and the second abutting surface 22 are inclined to the one end 13 from the second moving part 7 toward the footrest member 12 when viewed in plan view from the X direction. The second abutting surface 22 is inclined to the one end 13 steeper than the first abutting surface 21 when viewed in plan view form the X direction. Therefore, the second abutting surface 22 is inclined with respect to the first abutting surface 21.

As illustrated in FIG. 4, the following part 30 follows the first rotation operation A of the footrest member 12 and therefore, moves relatively along the first abutting surface 21 and the second abutting surface 22 while abutting on the first abutting surface 21 and the second abutting surface 22. The following part 30 abuts on the first abutting surface 21 and the second abutting surface 22 in the order thereof in the first rotation operation A. The abutting part 20 is a member referred to as a so-called cam and the following part 30 is referred to as a so-called cam follower.

The following part 30 includes a following shaft 31 extending in the X direction and a pair of rotating bodies 32 and 32 attached to an outer circumferential surface of the following shaft 31 and having a ring shape. The pair of rotating bodies 32 and 32 is oppositely disposed in the following shaft 31 to be spaced apart from each other by a predetermined gap in the X direction. The pair of rotating bodies 32 and 32 is rotatably attached to the following shaft 31. The rotating body 32 is, for example, a bearing. The pair of rotating bodies 32 is grounded to the top surface of the top plate 7a of the second moving part 7. The circumferential surface of the following shaft 31 disposed between the pair of rotating bodies 32 and 32 abuts on the first abutting surface 21 or the second abutting surface 22. The circumferential surface of the following shaft 31 abuts on the first abutting surface 21 in the neutral state of the footrest member 12.

The support part 50 is provided in the second moving part 7 to support the both ends of the following shaft 31. More specifically, the support part 50 includes a pair of body parts 51 disposed respectively adjacent to the both ends of the following shaft 31 and having a block shape, a plate-like connection part 52 extending so as to connect the lower portions of the pair of body parts 51 and 51, a pair of bearing parts 53 and 53 provided in the body parts 51 to rotatably support the both ends of the following shaft 31, and a plurality of sliding members 54 (in this case, four) and a plurality of sliding members 55 (in this case, four) provided in outer surfaces of the body parts 51.

A pair of the second opening parts 7e and 7e having an approximate rectangular shape is formed in the top plate 7a of the second moving part 7 corresponding to positions of the pair of body parts 51 and 51. The pair of body parts 51 and 51 is inserted respectively into the second opening parts 7e and 7e. The body part 51 protrudes upwardly and downwardly from the second opening part 7e. The body part 51 includes a main portion having an approximate rectangular parallelepiped shape and a plate-like protruding portion protruding from one side surface of the main portion on the side of the shaft 11 toward the shaft 11. The protruding portion is disposed above the top plate 7a. One end of a biasing member 40 to be described below is attached to the protruding portion.

The connection part 52 connects the lower portions of the pair of body parts 51 and 51 under the top plate 7a. The pair of bearing parts 53 and 53 rotatably supports the both ends of the following shaft 31 above the top plate 7a. The bearing part 53 is, for example, a bearing. An outer ring of the bearing part 53 is fixed to the body part 51. The outer ring of the bearing part 53 rotatably supports ends of the following shaft 31.

The four sliding members 54 are disposed respectively on top surfaces of the body parts 51. The sliding member 54 is disposed above the top plate 7a. The two sliding members 54 are arranged in the Y direction on the top surface of one body part 51. The remaining two sliding members 54 are arranged in the Y direction on the top surface of the other body part 51. The sliding member 54 is formed of, for example, a low-friction plastics such as polyacetal (POM).

Figure 7:
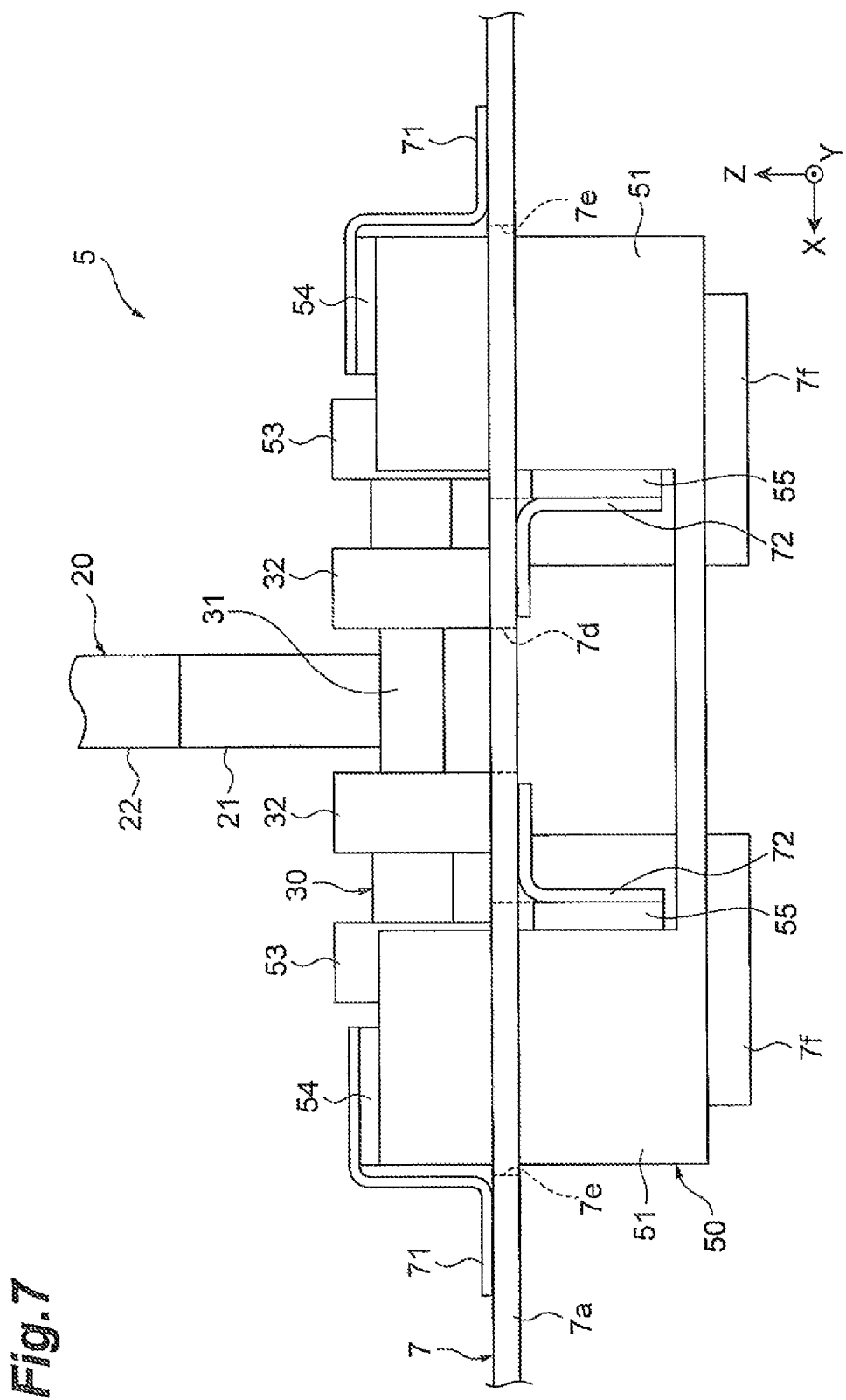
FIG. 7 is a front view illustrating the reaction force applying part of FIG. 1.

As illustrated in FIG. 7, the four sliding members 55 are respectively provided in inner side surfaces of the pair of body parts 51 and 51, which face to each other. The sliding member 55 is disposed under the top plate 7a. The two sliding members 55 are arranged in the Y direction on the inner side surface of one body part 51. The remaining two sliding members 55 are arranged in the Y direction on the inner side surface of the other body part 51. The sliding member 55 is formed of, for example, a low-friction plastics such as polyacetal (POM).

As illustrated in FIG. 4, an upward movement of the support part 50 in the Z direction is restricted by a pair of plate-like guide members 71 and 71 which is curved to have an approximate Z-shape. The pair of guide members 71 and 71 is respectively provided corresponding to the pair of body parts 51 and 51. The guide member 71 is curved to have an approximate Z-shape and is disposed, along a top surface of the top plate 7a, an outer side surface of the body part 51, and a top surface of the body part 51 above the top plate 7a. The guide member 71 extends in the Y direction. One end of the guide member 71 is fixed to the top surface of the top plate 7a. The other end of the guide member 71 comes into contact with the sliding member 54 disposed on the top surface of the body part 51. Also, a through hole (not illustrated) is formed in the guide member 71. The guide member 71 is attached to the top plate 7a by inserting a screw in the through hole. A diameter of the through hole is sufficiently larger than a diameter of the screw. Therefore, it is possible to appropriately adjust a position of the guide member 71 such that the guide member 71 preferably comes into contact with the sliding member 54.

A movement of the support part 50 in the X direction is restricted by a pair of plate-like guide members 72 and 72 which is curved to have an approximate L-shape. The pair of guide members 72 and 72 is respectively provided corresponding to the pair of body parts 51 and 51. The guide member 72 is curved to have an approximate L-shape and is disposed, along a bottom surface of the top plate 7a and the inner side surface of the body part 51 under the top plate 7a. The guide member 72 extends in the Y direction. One end of the guide member 72 is fixed to the bottom surface of the top plate 7a. The other end of the guide member 72 comes into contact with the sliding member 55 disposed on the inner side surface of the body part 51. Also, a through hole (not illustrated) is formed in the guide member 72. The guide member 72 is attached to the top plate 7a by inserting a screw in the through hole. A diameter of the through hole is sufficiently larger than a diameter of the screw. Therefore, it is possible to appropriately adjust a position of the guide member 72 such that the guide member 72 preferably comes into contact with the sliding member 55.

The upward movement of the support part 50 in the Z direction is restricted in such a way that the sliding member 54 comes into contact with the guide member 71. A downward movement of the support part 50 in the Z direction is restricted in such a way that the rotating body 32 of the following part 30 comes into contact with the top plate 7a. One-sided movement of the support part 50 in the X direction is restricted in such a way that the sliding member 55 provided in one body part 51 comes into contact with one guide member 72. The other-sided movement of the support part 50 in the X direction is restricted in such a way that the sliding member 55 provided in the other body part 51 comes into contact with the other guide member 72. On the other hand, movement of the support part 50 in the Y direction is made possible. In this case, the sliding member 54 slides along the guide member 71, and the sliding member 55 slides along the guide member 72. The support part 50 slides in the Y direction while support part 50 being guided by the guide member 71 and the guide member 72. Accordingly, the support part 50 is slidable in the Y direction with respect to the moving part 3 (second moving part 7).

The biasing member 40 causes a biasing force to act between the following part 30 and the first abutting surface 21, and between the following part 30 and the second abutting surface 22. More specifically, the biasing member 40 biases the following shaft 31 of the following part 30 with respect to the first abutting surface 21 and the second abutting surface 22. The pair of biasing members 40 and 40 is respectively provided corresponding to the pair of body parts 51 and 51. The biasing member 40 pulls the support part 50 toward the shaft 11 above the top plate 7a. The biasing member 40 is, for example, a tension spring. As described above, one end of the biasing member 40 is attached to a protruding portion of the body part 51 of the support part 50. The other end of the biasing member 40 is attached to a plate-like fixing member 73, which is disposed closer to the shaft 11 than the support part 50 and is curved to have an approximate Z-shape. The fixing member 73 is fixed to the top surface of the top plate 7a.

As illustrated in FIG. 8, the adjusting part 60 stops the movement of the support part 50 toward the shaft 11, which is pulled by the biasing member 40, at a predetermined position. The pair of adjusting parts 60 and 60 is respectively provided corresponding to the pair of body parts 51 and 51. The pair of adjusting parts 60 and 60 is arranged in the X direction. In FIG. 8, the biasing member 40 on the front side is only illustrated, and the biasing member 40 on the behind side is hidden by the biasing member 40 on the front side. The adjusting part 60 is disposed on the side of the shaft 11 of the body part 51, under the top plate 7a. The adjusting part 60 includes a head part 61 and a shaft 62 extending from the head part 61 toward the body part 51 and abutting on a side surface of the body part 51. The adjusting part 60 is, for example, a screw or the like. A male screw is formed on an outer circumferential surface of the shaft 62. The shaft 62 is engaged with a hole part 7g formed in a protrusion 7f protruding downwardly from the bottom surface of the top plate 7a. When the head part 61 is rotated, the shaft 62 moves forward and backward in the Y direction. Accordingly, a position of the support part 50 is changed in the Y direction. When the position of the support part 50 is changed, a position of the following part 30 is also changed and a position of the abutting part 20 in the Z direction is changed. In the two reaction force applying parts 5 on the side of the one end 13 and the side of the other end 14, one abutting part 20 is raised, and the other abutting part 20 is lowered. By appropriately adjusting the adjusting parts 60 of the reaction force applying parts 5, it is possible to realize a state in which the abutting parts 20 do not receive a force from the biasing members 40 and the abutting parts 20 come into contact with the following parts 30. This adjustment is executed at the time of factory shipment.

Figure 9:
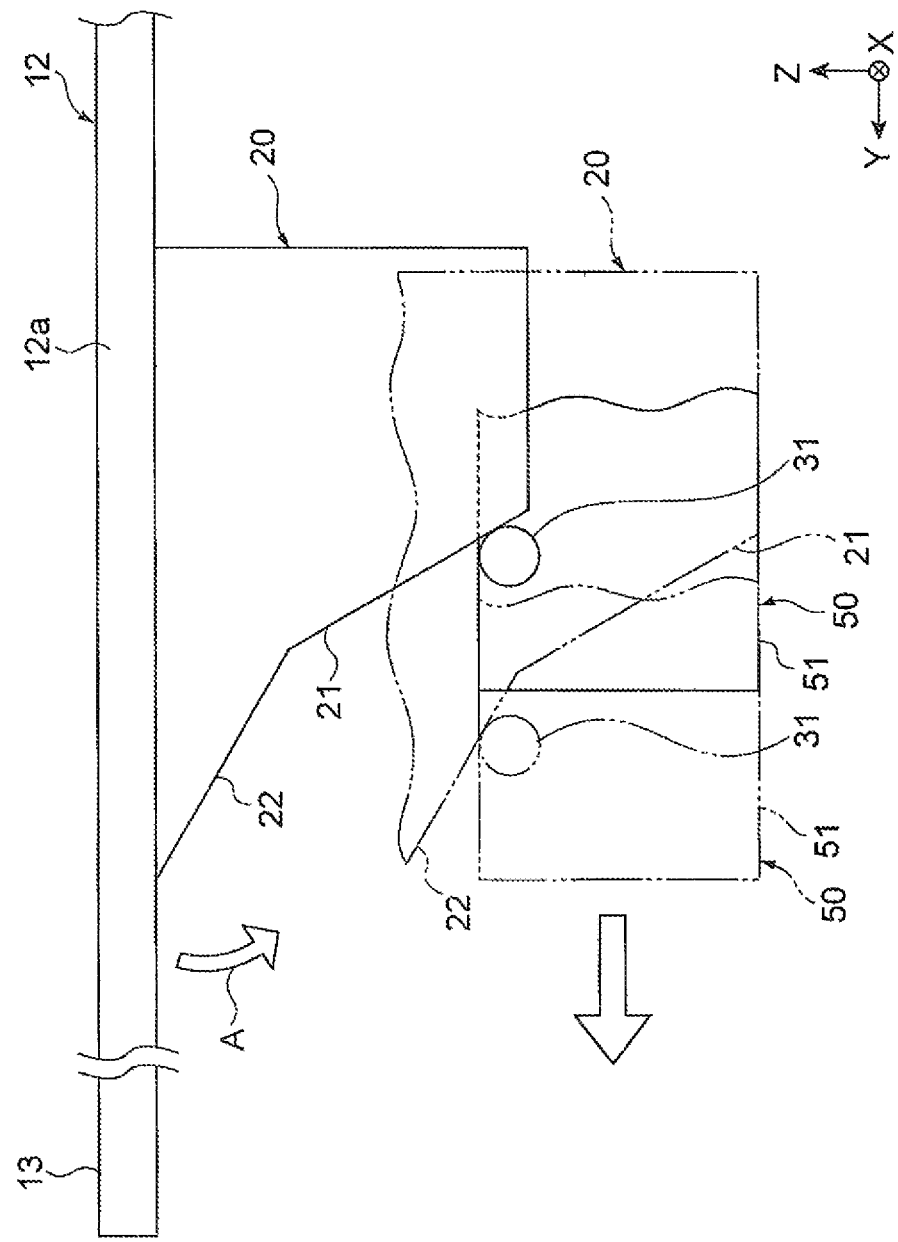
FIG. 9 is a side view illustrating operation of the foot-operated pointing device of FIG. 1.

As illustrated in FIG. 9, when the first rotation operation A of the footrest member 12 is executed, the abutting part 20 rotates around the shaft 11 counterclockwise when viewed in a direction passing through the sheet of FIG. 9. At this time, the following shaft 31 of the following part 30 follows the first rotation operation A, and therefore, relatively moves along the first abutting surface 21 and the second abutting surface 22 while abutting on the first abutting surface 21 and the second abutting surface 22 in the order thereof. Since the following shaft 31 is rotatably supported by the support part 50, the following shaft 31 abuts on the first abutting surface 21 and the second abutting surface 22 while rotating. The support part 50 slides toward the one end 13 in the Y direction by a force transferred from the abutting part 20 through the following part 30. The pair of rotating bodies 32 and 32 of the support part 50 rolls on the top plate 7a at the time of sliding.

The support part 50 is pulled from the biasing member 40 toward the shaft 11 in the Y direction. The support part 50 does not move toward the one end 13 in the Y direction until a fore from the following part 30 exceeds an initial tension of the biasing member 40. Therefore, when the user attempts to rotate the footrest member 12 by pressing the footrest member 12, the footrest member 12 does not move from the neutral state until a force from the foot exceeds a predetermined value. Due to this function, it is possible to prevent a click from being unintentionally generated by a small force.

When the second rotation operation B of the footrest member 12 is executed, the abutting part 20 rotates around the shaft 11 clockwise when viewed in a direction passing through the sheet of FIG. 9. At this time, the following shaft 31 of the following part 30 follows the second rotation operation B, and therefore, relatively moves along the second abutting surface 22 and the first abutting surface 21 while abutting on the second abutting surface 22 and the first abutting surface 21 in the order thereof. The support part 50 slides toward the shaft 11 by a biasing force of the biasing member 40. Since, when the footrest member 12 reaches the neutral state, the support part 50 corresponds to a front end of the shaft 62, the support part 50 does not move toward the shaft 11 in the Y direction. Continuously, when the third rotation operation C of the footrest member 12 is started, the following part 30 cannot follow the abutting part 20, and therefore, the abutting part 20 is separated from the following part 30. Accordingly, the reaction force applying part 5 on the side of the one end 13 does not influence the third rotation operation C and the fourth rotation operation D. Also, when the third rotation operation C and the fourth rotation operation D of the footrest member 12 are executed, the same operations as the first rotation operation A and the second rotation operation B are executed.

As described above, in the foot-operated pointing device 1, the second abutting surface 22 is inclined with respect to the first abutting surface 21. Therefore, a reaction force applied to the abutting part 20 by the following part 30 is changed instantaneously and largely at a time when the following part 30 is transferred from the first abutting surface 21 to the second abutting surface 22. As a result, a click feeling is provided to the user through the footrest part 4. In this way, it is possible to improve the click feeling in the foot-operated pointing device 1, by using a slope of the second abutting surface 22 with respect to the first abutting surface 21

Also, the foot-operated pointing device 1 includes the support part 50 provided in the moving part 3 to support the following part 30 and the support part 50 is slidable with respect to the moving part 3. Therefore, the following part 30 relatively and stably moves along the first abutting surface 21 and the second abutting surface 22. Accordingly, the abutting state of the following part 30 with respect to the first abutting surface 21 and the second abutting surface 22 can be stabilized and the click feeling can be improved.

Also, the foot-operated pointing device 1 includes an adjusting part which adjusts an abutting state of the following part 30 with respect to the abutting part 20. Therefore, it is possible to realize the neutral state in which the abutting part 20 does not receive a biasing force from the biasing member 40 and the abutting part 20 comes into contact with the following part 30. In this way, it is possible to more improve a click feeling.

In the foot-operated pointing device 1, the second abutting surface 22 is inclined steeper than the first abutting surface 21 with respect to a line parallel to the Z direction. Therefore, a reaction force applied to the abutting part 20 by the following part 30 is changed instantaneously from a small reaction force to a large reaction force at a time when the following part 30 is transferred from the first abutting surface 21 to the second abutting surface 22. In this way, it is possible to more improve a click feeling.

In the foot-operated pointing device 1, when the detection value from the second detection part 16 becomes equal to or greater than the third threshold value indicating that the detection value approaches the first threshold value in a state in which a movement of a pointer is being instructed and the detection value from the second detection part 16 is below the first threshold value, the controller 17 stops indication of movement of the pointer. Accordingly, the movement of the pointer on an operation screen of a computer or the like is stopped. The user who has seen that the pointer no longer moves finds out that the rotation of the footrest member 12 is too large, and loosens the force of the user's foot. In this way, it is possible to prevent the detection value from the second detection part 16 from becoming equal to or greater than the first threshold value, and prevent a case in which the movement of the pointer is dragged.

In the foot-operated pointing device 1, when the detection value from the second detection part 16 becomes equal to or less than the fourth threshold value indicating that the detection value approaches the second threshold value in a state in which instruction of a drag is being performed, the controller 17 stops instruction of movement of the pointer. Therefore, the movement of an icon or the like which is dragged is stopped on the operation screen of a computer or the like. The user who has seen that-the icon or the like no longer moves finds out that the rotation of the footrest member 12 is too small, and rotates the footrest member 12 sufficiently by strengthening a force of the user's foot. In this way, it is possible to prevent the detection value from the second detection part 16 from becoming equal to or less than the second threshold value, and prevent a case in which the drag is unintentionally terminated.

The foot-operated pointing device 1 includes a storage part 18 which stores at least one of the first threshold value and the second threshold value. The controller 17 changes at least one of the first threshold value and the second threshold value stored in the storage part 18 based on an output from the computer 19. Therefore, it is possible to change a force necessary for a click and a drag according to the strength of a force from a foot of the user. As a result, it is possible to realize an operation environment suitable for each of users.

Second Embodiment

Figure 10:
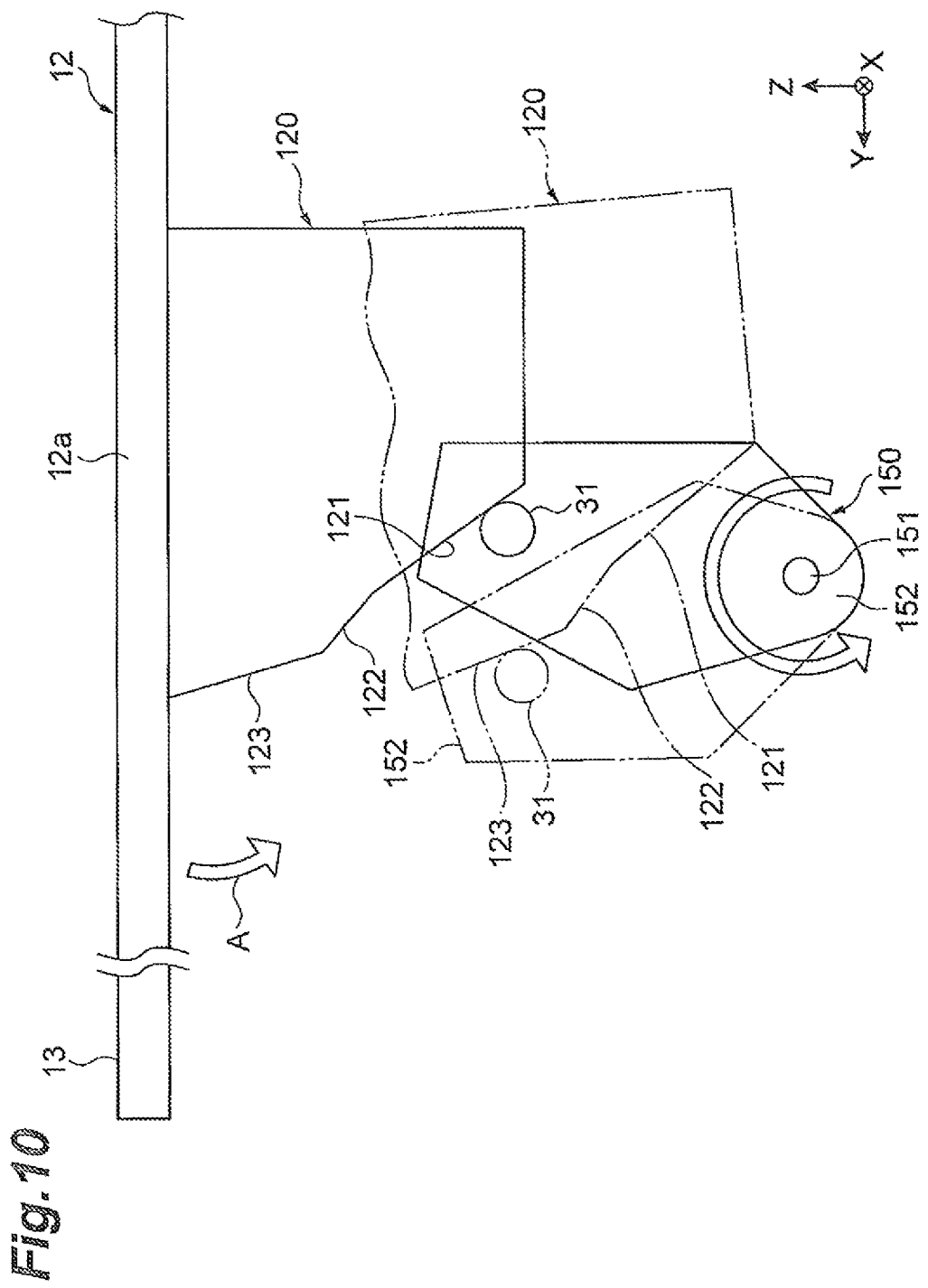
FIG. 10 is a side view illustrating a portion of a reaction force applying part included in a foot-operated pointing device according to a second embodiment.

According to the first embodiment, the abutting part 20 includes the first abutting surface 21 and the second abutting surface 22, as end surfaces directed to the one end 13 of the footrest member 12. On the other hand, according to the present embodiment, as illustrated in FIG. 10, an abutting part 120 includes a first abutting surface 121, a second abutting surface 122, and a third abutting surface 123, as end surfaces directed to the one end 13 of the footrest member 12. In this respect, the present embodiment is different from the first embodiment.

The first abutting surface 121, the second abutting surface 122, and the third abutting surface 123 are arranged in the Y direction. The first abutting surface 121, the second abutting surface 122, and the third abutting surface 123 are arranged from the shaft 11 toward the one end 13, in the order of the first abutting surface 121, the second abutting surface 122, and the third abutting surface 123. The first abutting surface 121, the second abutting surface 122, and the third abutting surface 123 are connected adjacent to one another in the Y direction.

Also, the first abutting surface 121, the second abutting surface 122, and the third abutting surface 123 are arranged in the Z direction. The first abutting surface 121, the second abutting surface 122, and the third abutting surface 123 are arranged from the second moving part 7 toward the footrest member 12, in the order of the first abutting surface 121, the second abutting surface 122, and the third abutting surface 123. The first abutting surface 121, the second abutting surface 122, and the third abutting surface 123 are connected adjacent to one another in the Z direction.

The first abutting surface 121, the second abutting surface 122, and the third abutting surface 123 are inclined with respect to a line parallel to the Z direction when the footrest member 12 is in the neutral state. The first abutting surface 121, the second abutting surface 122, and the third abutting surface 123 are inclined to the one end 13 from the second moving part 7 toward the footrest member 12 when viewed in plan view from the X direction. The second abutting surface 122 is the most inclined among the abutting surfaces 121, 122 and 123 with respect to the line parallel to the Z direction. On the other hand, the third abutting surface 123 is the least inclined among the abutting surfaces 121, 122 and 123 with respect to the line parallel to the Z direction.

In the foot-operated pointing device of the present embodiment, a reaction force applied to the abutting part 20 by the following part 30 is changed from a small reaction force to a large reaction force at a time when the following part 30 is transferred from the first abutting surface 121 to the second abutting surface 122. Subsequently, a reaction force applied to the abutting part 20 by the following part 30 is changed instantaneously from a large reaction force to a small reaction force at a time when the following part 30 is transferred from the second abutting surface 122 to the third abutting surface 123. As described above, the user can feel a click feeling due to the instantaneous change from the large reaction force to the small reaction force.

Although the foot-operated pointing device 1 of the first embodiment includes the support part 50 disposed in the moving part 3 to support the following part 30, as illustrated in FIG. 10, the foot-operated pointing device of the present embodiment includes a support part 150 disposed in the moving part 3 to support the following part 30. In this respect too, the present embodiment is different from the first embodiment.

The support part 150 is rotatable with respect to the moving part 3. The support part 150 includes a shaft 151 extending in the X direction and a pair of body parts 152 and 152 which rotates around the shaft 151. The pair of body parts 152 and 152 is arranged in the X direction. In FIG. 10, the body part 152 on the front side is only illustrated, and the body part 152 on the behind side is hidden by the body part 152 on the front side. Base ends of the pair of body parts 152 and 152 are respectively attached to both ends of the shaft 151. Front ends of the pair of body parts 152 and 152 rotatably support the both ends of the following shaft 31 respectively. The support part 150 is pulled toward the shaft 11 by the biasing member 40. Movement toward the shaft 11 of the support part 150 is stopped at a predetermined position by the adjusting part 60. Therefore, it is possible to stabilize an abutting state of the following part 30 with respect to abutting surfaces of the abutting part 20 even in a case in which a rotation mechanism is applied to the support part 150.

While the embodiments of the invention have been described above, the present invention is not limited to the aforementioned embodiments.

For example, a configuration whereby the shaft 11 is not present in the footrest part 4 would also be possible. A protrusion is formed in one of the footrest member 12 and the support plates 7c, a recess or hole is formed in the other, and these are combined to enable the footrest member 12 to rotate with respect to the moving part 3 around the X direction.

Although the foot-operated pointing device is described as including the two reaction force applying parts 5 in the aforementioned embodiments, the reaction force applying part 5 may be disposed only at one of the one end 13 and the other end 14. Also, although the reaction force applying part 5 includes the pair of biasing members 40 and 40 and the pair of adjusting parts 60 and 60, the reaction force applying part 5 may include only a single biasing member 40 and a single adjusting part 60.

Although the first abutting surface 21 and the second abutting surface 22 of the reaction force applying part 5 at the one end 13 are described as being end surfaces directed to the one end 13 of the footrest member 12 in the aforementioned embodiments, for example, the first abutting surface 21 and the second abutting surface 22 may be end surfaces directed to the shaft 11 of the footrest member 12. In this case, the biasing member 40 pulls the support part 50 toward the one end 13. Similarly, in the reaction force applying part 5 at the other end 14, the first abutting surface 21 and the second abutting surface 22 may be end surfaces directed to the shaft 11 of the footrest member 12.

Although the first direction is defined as a direction perpendicular to the opposite direction between the moving part 3 and the footrest part 4 in the aforementioned embodiments, the first direction may be a direction intersecting with the opposite direction between the moving part 3 and the footrest part 4. Also, although the second direction is defined as a direction perpendicular to the opposite direction between the moving part 3 and the footrest part 4 and the first direction in the aforementioned embodiments, the second direction may be a direction intersecting with the opposite direction between the moving part 3 and the footrest part 4 and the first direction.

In the aforementioned embodiment, the following part 30 is disposed on the side of the moving part 3, and the abutting part 20 is disposed on the side of the footrest part 4. The arrangement may be performed in the opposite manner to the above arrangement. That is, the abutting part 20 may be disposed on the side of the moving part 3, and the following part 30 may be disposed on the side of the footrest part 4. In this case, the support parts 50, 150 support the abutting part 20. Furthermore, the aforementioned embodiment describes that the support parts 50, 150 are provided in the moving part 3 side; however, the support parts 50, 150 may also be provided in the footrest part 4 side.

Subsequently, Embodiment 1 and Embodiment 2 will be described.

Figure 11:
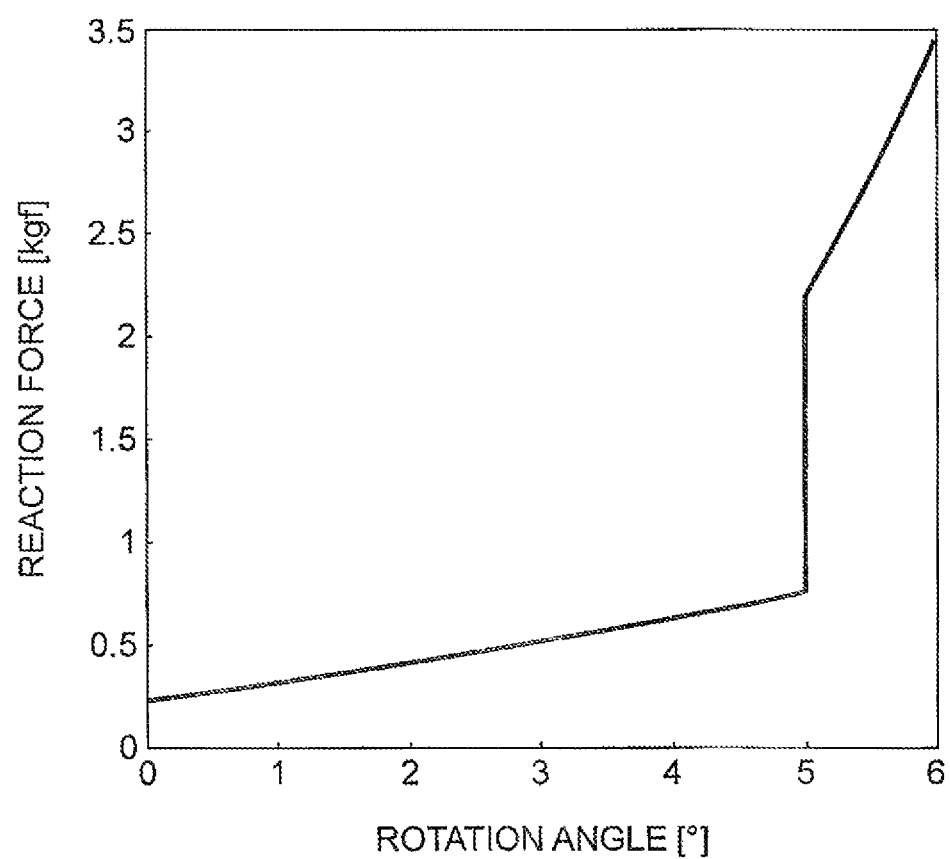
FIG. 11 is a graph illustrating a magnitude of a reaction force with respect to a rotation angle of a footrest member in Embodiment 1.

FIG. 11 is a graph illustrating a magnitude of a reaction force with respect to a rotation angle of the footrest member 12 in Embodiment 1. The graph is a measurement result in the case of using the foot-operated pointing device 1 of the first embodiment. A horizontal axis of the graph represents a rotation angle (unit is "degree") of the footrest member 12 in the case of executing the first rotation operation A or the third rotation operation C from the neutral state. A vertical axis represents a reaction force (unit is "kgf") at a position of 100 mm from the shaft 11 toward the one end 13, or from the shaft 11 toward the other end 14.

While the following part 30 is abutting on the first abutting surface 21, a reaction force at a gentle slope also increases according to an increase in the rotation angle. When the rotation angle reaches near 5 degrees, the following part 30 is transferred from the first abutting surface to the second abutting surface, and a reaction force, which has been in the range of 0.5 to 1.0 kgf, sharply increases to about 2.0 kgf to 2.5 kgf. At this time, a click feeling is provided to the user. Thereafter, while the following part 30 is abutting on the second abutting surface 22, a reaction force at a steep slope also increases according to an increase in the rotation angle.

Figure 12:
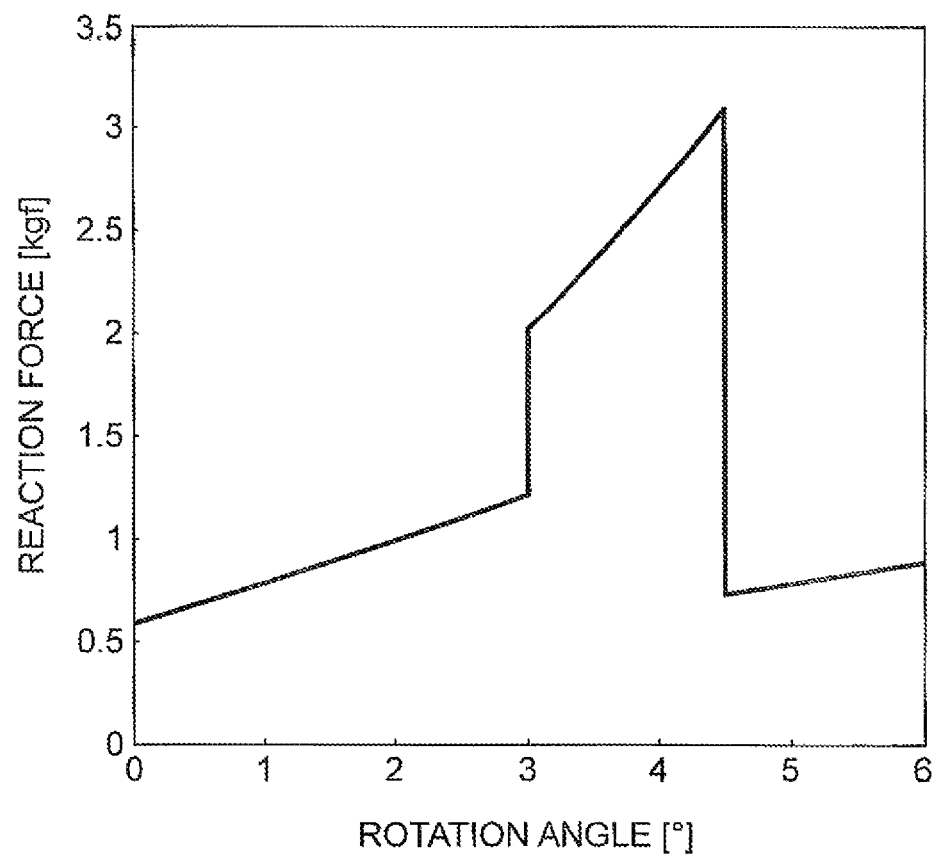
FIG. 12 is a graph illustrating a magnitude of a reaction force with respect to a rotation angle of a footrest member in Embodiment 2.

FIG. 12 is a graph illustrating a magnitude of a reaction force with respect to a rotation angle of the footrest member 12 in Embodiment 2. The graph is a measurement result in the case of using the foot-operated pointing device of the second embodiment. Since horizontal and vertical axes of the graph are identical to those of FIG. 11, a detailed description will be omitted.

While the following part 30 is abutting on the first abutting surface 121, a reaction force at a gentle slope also increases according to an increase in the rotation angle. When the rotation angle reaches near 3 degrees, the following part 30 is transferred from the first abutting surface 121 to the second abutting surface 122, and a reaction force, which has been in the range of about 1.0 kgf to 1.5 kgf, increases to about 2.0 kgf. Thereafter, while the following part 30 is abutting on the second abutting surface 122, a reaction force at a steep slope also increases according to an increase in the rotation angle. When the rotation angle reaches almost 4.5 degrees, the following part 30 is transferred from the second abutting surface 122 to the third abutting surface 123, and a reaction force, which has been in the range of about 3.0 kgf to 3.5 kgf, sharply decreases to about 0.5 kgf to 1.0 kgf. At this time, a click feeling is provided to the user. Thereafter, while the following part 30 is abutting on the third abutting surface 123, a reaction force at a gentle slope also increases according to an increase in the rotation angle.

REFERENCE SIGNS LIST 1 foot-operated pointing device
2 base
3 moving part
4 footrest part
5 reaction force applying part
11 shaft
12 footrest member
13 one end
14 the other end
15 first detection part
16 second detection part
17 controller
18 storage part
20 abutting part
21 first abutting surface
22 second abutting surface
30 following part
40 biasing member
50,150 support part
60 adjusting part

What is claimed is:

1. A foot-operated pointing device comprising:
a base;
a moving part oppositely disposed on the base and moveable along a top surface of the base;
a footrest part oppositely disposed on the moving part and including a footrest member;
a first detection part configured to detect a movement of the moving part;
a second detection part configured to detect a rotation of the footrest member with respect to the moving part; and
a controller configured to instruct movement of a pointer based on a detection value from the first detection part and instruct a click when a detection value from the second detection part becomes equal to or greater than a first threshold value and thereafter, becomes equal to or less than a second threshold value,
wherein the footrest member rotates with respect to the moving part around a first direction intersecting with an opposite direction between the moving part and the footrest part, and has one end and the other end in a second direction intersecting with the opposite direction and the first direction,
wherein the controller
instructs a drag when the detection value from the second detection part is maintained equal to or greater than the first threshold value and instruction of the movement of the pointer is being performed, and
stops instruction of the movement of the pointer when the detection value from the second detection part becomes equal to or less than a fourth threshold value indicating that the detection value approaches the second threshold value in a state in which the drag is being instructed.

2. The foot-operated pointing device according to claim 1, further comprising a reaction force applying part configured to apply a reaction force to the rotating footrest part,
wherein the reaction force applying part applies a reaction force to the footrest member in a case of a first rotation operation in which the one end of the footrest member is close to the moving part,
the reaction force applying part includes:
an abutting part provided in one of the moving part and the footrest part and having a first abutting surface and a second abutting surface arranged in the second direction,
a following part provided in the other of the moving part and the footrest part and configured to follow the first rotation operation of the footrest member to relatively move along the first abutting surface and the second abutting surface while abutting on the first abutting surface or the second abutting surface, and
a biasing member configured to cause a biasing force to act between the following part and the first abutting surface, and between the following part and the second abutting surface,
the following part abuts on the first abutting surface and the second abutting surface in an order thereof in the first rotation operation, and
the second abutting surface is inclined with respect to the first abutting surface.

3. The foot-operated pointing device according to claim 2, further comprising a support part provided in the moving part to support one of the abutting part and the following part,
wherein the support part is slidable with respect to the moving part.

4. The foot-operated pointing device according to claim 2, further comprising a support part provided in the moving part to support one of the abutting part and the following part,
wherein the support part is rotatable with respect to the moving part.

5. The foot-operated pointing device according to claim 2, further comprising an adjusting part configured to adjust an abutting state of the following part with respect to the abutting part.

6. The foot-operated pointing device according to claim 1, further comprising
a storage part configured to store at least one of the first threshold value and the second threshold value,
wherein the controller changes at least one of the first threshold value and the second threshold value stored in the storage part based on an output from the outside.

* * * * *